(12) United States Patent
Ruppert

(10) Patent No.: US 11,318,851 B2
(45) Date of Patent: May 3, 2022

(54) ENERGY SYSTEM FOR AN ELECTRICALLY-DRIVEN VEHICLE

(71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/031,715

(22) Filed: Sep. 24, 2020

(65) Prior Publication Data

US 2021/0086629 A1 Mar. 25, 2021

(30) Foreign Application Priority Data

Sep. 25, 2019 (DE) .......................... 102019125734.4

(51) Int. Cl.
*B60L 53/10* (2019.01)
(52) U.S. Cl.
CPC ........... *B60L 53/11* (2019.02); *B60L 2210/10* (2013.01)
(58) Field of Classification Search
CPC ...... B60L 53/11; B60L 2210/10; B60L 58/20; B60L 58/22; B60L 53/20; Y02T 90/14; Y02T 10/7072; Y02T 10/70; Y02T 10/72; B60R 16/033; H02J 7/0014; H02J 2310/48
USPC ........................................................ 320/140
See application file for complete search history.

(56) References Cited

U.S. PATENT DOCUMENTS

| 6,828,755 B1 | 12/2004 | Iverson et al. |
| 2014/0035531 A1 | 2/2014 | Garnier et al. |
| 2017/0214252 A1* | 7/2017 | Preindl ................. H02J 7/0014 |

FOREIGN PATENT DOCUMENTS

| DE | 10 2009 033 185 A1 | 11/2010 |
| DE | 10 2011 119 904 A1 | 6/2013 |
| WO | 2018/107065 A1 | 6/2018 |

* cited by examiner

*Primary Examiner* — Paul Dinh
(74) *Attorney, Agent, or Firm* — Seed IP Law Group LLP

(57) ABSTRACT

An energy system for an electrically-driven vehicle is provided along with methods for operating the energy system. The energy system has a low-voltage charging function and an active load-balancing system for traction batteries.

10 Claims, 2 Drawing Sheets

ENERGY SYSTEM FOR AN ELECTRICALLY-DRIVEN VEHICLE

TECHNICAL FIELD

Embodiments of the present invention relate to an energy system for an electrically-driven vehicle and to methods for operating the energy system. The energy system has a low-voltage charging function and an active load-balancing system for traction batteries.

DESCRIPTION OF THE RELATED ART

Today's electric vehicles have a high-voltage vehicle electrical system to which various consumers are connected, e.g., a charger (on-board charger, OBC), DC voltage converters for converting high voltage into low voltage (HV-LV DC/DC converters), traction converters, heaters, air-conditioning compressors, etc. At present, electric and hybrid vehicles are mainly charged using the alternating current network (AC charging infrastructure). However, investigations show that, in the future, charging in the private as well as in the public area will take place via direct current charging (DC charging).

Currently, two expensive HV control units are installed for charging the HV battery and for supplying the 12 V vehicle electrical system, wherein the OBC is active only when the vehicle is at a standstill and the HV-LV DC/DC converter is active only when driving. In addition, only a passive load balancing currently takes place between the individual battery cells (passive cell balancing) in the HV energy store (HV battery). In order to keep the individual cells at the same voltage level, excess energy of the cells is converted into heat (power loss) and dissipated.

DE 10 2009 033 185 A1 discloses a charging system and charging methods for charging a battery of a motor vehicle. Instead of an on-board charger, the charging system comprises an additional converter which performs the function of the OBC. The integration of the second converter is implemented by a double converter. The second converter converts the AC mains voltage into a DC charging voltage suitable for the HV battery. In order to charge the 12 V battery when driving, an HV-LV DC/DC converter is required.

WO 2018 107 065 A1 relates to an intelligent energy storage system, e.g., for an electric vehicle, which has a series of energy storage modules, which in turn have a series of module cells, each equipped with a bi-directional DC voltage converter and serving for cell current balancing.

BRIEF SUMMARY

Against the background outlined above, embodiments of the invention are based upon the aim of providing an energy system for an electric vehicle which has neither an on-board charger nor an HV-LV DC/DC converter, and also methods for operating the energy system.

The aim is achieved by a device with the features described herein and by methods with the features described herein.

The device according to embodiments of the invention manages completely without an OBC and without an HV-LV DC/DC converter. Since, in the future (after 2025), vehicles will be charged 99% via DC charging, the AC charger can be omitted. For the remaining 1%, the new architecture provides low-voltage DC charging, e.g., of 12 V.

Embodiments of the invention relate to an energy system for an electrically-driven vehicle. The energy system comprises a traction circuit having at least one HV energy store (HV battery, traction battery) that comprises several storage cells connected in series, and a traction inverter that supplies alternating voltage to at least one electric machine of the vehicle drive.

Each of the storage cells of the at least one HV energy store is assigned a bi-directional DC voltage converter with galvanic isolation, the inputs of which are connected to the poles of the storage cell and the outputs of which are connected to a low-voltage vehicle electrical system. In one embodiment, a bi-directional DC/DC converter is integrated into each battery cell. Since the DC/DC converters are bi-directional, energy flow can occur in both directions.

The energy system enables a vehicle architecture without an on-board charger (OBC) and without an HV-LV DC/DC converter. The functionalities of the two omitted HV control units are realized at the cell level of the at least one HV energy store by means of small, bi-directional DC/DC converters with galvanic isolation. The energy system manages with only one bi-directional DC/DC converter stage per cell. As a result, it is also possible to ensure energy exchange between any two cells of the at least one HV energy store, which is necessary for complete cell balancing.

The functionality of the HV-LV DC/DC converter is replaced in that, when driving the vehicle, the DC/DC converters convert the energy from HV to LV and thus charge the low-voltage vehicle electrical system (for example, a 12 V vehicle electrical system).

The functionality of the on-board charger (OBC) is replaced in that, during charging, the DC/DC converters convert the energy from LV to HV and thus charge the traction battery. In this case, the charging voltage is, conceptually, a protective low voltage (U<60 V), e.g., 12 V, which has no particular requirements as to contact protection and insulation.

In one embodiment of the energy system, the low-voltage vehicle electrical system is operated at a voltage of less than 60 V, e.g., at 12 V.

In one embodiment, the low-voltage vehicle electrical system has at least one low-voltage energy store (LV battery).

In one embodiment, the low-voltage vehicle electrical system has an interface for connecting a low-voltage DC charger (low-voltage charger).

In one embodiment, the traction circuit of the energy system has an interface for connecting a high-voltage DC charger (e.g., a charging station, charging column, or DC wallbox).

In one embodiment of the energy system, the at least one HV energy store has an output voltage in the range of 300 to 1,200 V, e.g., 400 V or 800 V.

The subject-matter described herein also includes methods for operating the energy system.

In one embodiment, the method includes charging the at least one HV energy store by connecting a low-voltage DC charger to the low-voltage vehicle electrical system and transferring electrical energy from the low-voltage DC charger to the storage cells of the at least one HV energy store via the low-voltage vehicle electrical system and the bi-directional DC voltage converters with galvanic isolation.

The charging operation takes place during a standstill of the vehicle. The HV charging is effected via the low-voltage vehicle electrical system, which, in one embodiment, is a 12 V vehicle electrical system. For charging, a 12 V charger can simply be connected to the jump-start connection point in the car, for example. The DC/DC converters convert 12 V to the necessary cell charging voltage and charge the HV energy store.

This low-voltage DC charging (charging with a protective low voltage, i.e., a voltage <60 V, LV charging) creates the prerequisites for automated charging since no special requirements as to insulation and contact protection have to be met.

In a further embodiment, the method comprises supplying the low-voltage vehicle electrical system and, optionally, charging the at least low-voltage energy store by transferring electrical energy from the at least one HV energy store, via the bi-directional DC voltage converters with galvanic isolation, to the low-voltage vehicle electrical system.

In a further embodiment, the method comprises a load balancing ("active cell balancing") between the storage cells of the at least one HV energy store, in which electrical energy from at least one storage cell whose output voltage is higher than the average output voltage of all storage cells is transferred, via the bi-directional DC voltage converter with galvanic isolation and the low-voltage vehicle electrical system, to at least one storage cell whose output voltage is lower than the average output voltage of all storage cells.

Active cell balancing can increase the service life of the cells, increase efficiency, and identify and support weak cells. Active cell balancing also leads to an increase in energy efficiency, i.e., an increase in the range of the vehicle.

The advantages of the energy system also include the ability to dispense with an on-board charger together with an HV control unit, cooling tubing, mounting, and HV wiring, as well as an HV-LV DC/DC converter, including cooling tubing, mounting, and HV wiring. As a result, the total weight of the vehicle is also reduced, thereby increasing the range of the vehicle.

The energy system can be operated with HV energy stores of different output voltages. For example, the traction network can be operated at a voltage of 400 V or even 800 V.

The HV energy store of the energy system can be charged with a low-voltage energy source, i.e., with a voltage of less than 60 V. At such a low charging voltage, there are no special requirements as to insulation and contact protection. Endangerment of human life is ruled out. The safe voltage level (U<60 V) therefore even makes automating the charging process (automatic LV charging) possible.

Additional advantages and embodiments result from the description and the accompanying drawings.

It goes without saying that the features mentioned above and the features yet to be explained below can be used not only in the combination specified in each case but also in other combinations or alone.

BRIEF DESCRIPTION OF THE SEVERAL VIEWS OF THE DRAWINGS

Embodiments of the invention are illustrated schematically in the drawings and will be described in more detail with reference to the drawings.

DETAILED DESCRIPTION

Figure 1:
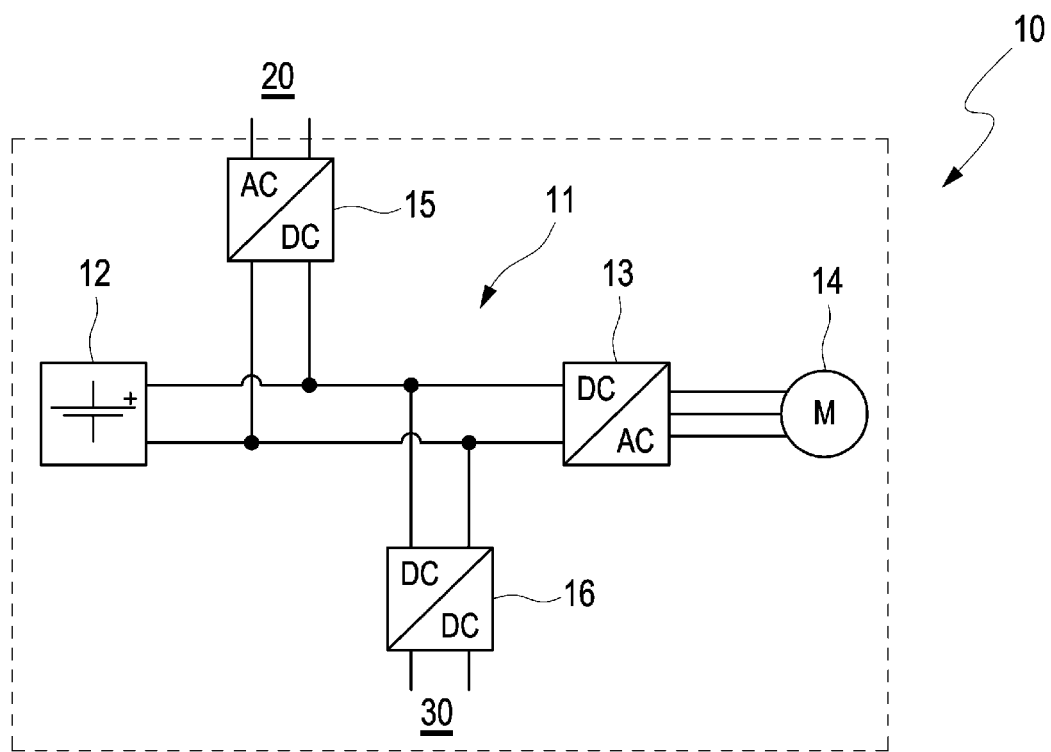
FIG. 1 illustrates an energy system of the prior art.

FIG. 1 schematically shows an energy system 10 of an electrically-driven vehicle according to the prior art. A traction circuit 11 comprises an HV energy store 12 and a traction converter (DC/AC converter) 13 which supplies alternating current to at least one electric machine 14 of the vehicle drive.

Connected to the traction circuit 11 is an on-board charger (AC/DC converter) 15 which can be connected to an AC network infrastructure 20 in order to charge the HV energy store 12 (AC charging). The on-board charger 15 is active only when it is connected to an AC power network infrastructure 20 and when the vehicle is at a standstill.

Furthermore, an HV-LV DC/DC converter 16 is connected to the traction circuit 11 and converts the high voltage of the HV energy store 12 to low voltage, and is connected to a low-voltage vehicle electrical system 30, which may, for example, be a 12 V vehicle electrical system. The low-voltage vehicle electrical system 30 can be supplied with electrical energy from the traction circuit 11 via the HV-LV DC/DC converter 16. The HV-LV DC/DC converter is normally active only when driving in order to support the low-voltage vehicle electrical system 30 and to charge a low-voltage energy store, e.g., a 12 V battery, connected thereto.

Figure 2:
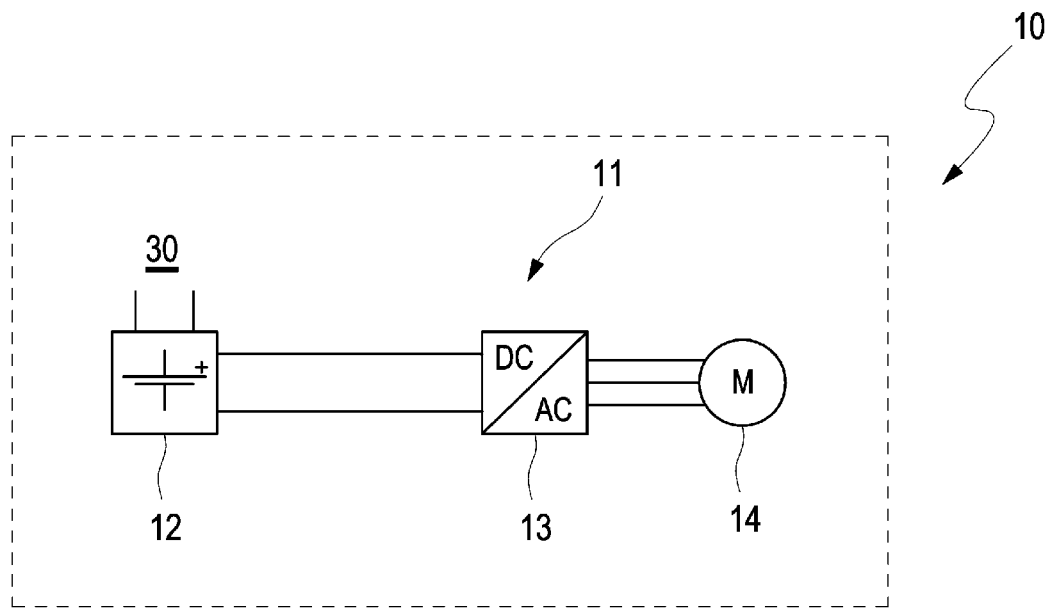
FIG. 2 illustrates an embodiment of the energy system according to the invention.

FIG. 2 shows schematically an embodiment of the energy system 10. A traction circuit 11 comprises an HV energy store 12 and a traction converter (DC/AC converter) 13 which supplies alternating current to at least one electric machine 14 of the vehicle drive.

However, a low-voltage vehicle electrical system 30, which may, for example, be a 12 V vehicle electrical system, is connected directly to the HV energy store 12. The on-board charger and the HV-LV DC/DC converter are omitted. As a result, fewer components are required for the energy system, and weight and installation space are saved. Since the omitted units have a relatively high power consumption (e.g., 3.6 kW each) and must be actively cooled during operation, energy savings also result.

Figure 3:
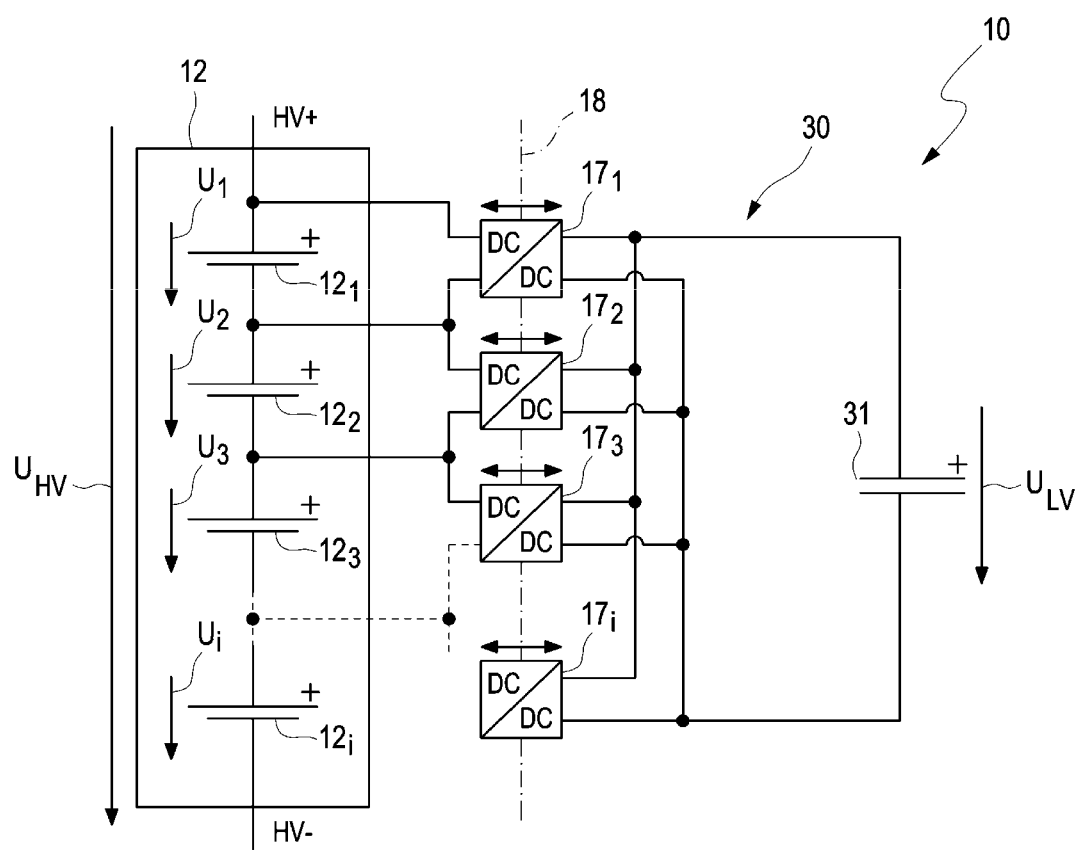
FIG. 3 illustrates a detail of a circuit diagram of an embodiment of the energy system according to the invention.

FIG. 3 schematically shows a detail of a circuit diagram of an embodiment of the energy system 10, said detail including the HV energy store 12 and the low-voltage vehicle electrical system 30.

The HV energy store comprises a plurality of cells $12_1$, $12_2$, $12_3$, $12_i$ connected in series. Each of the cells $12_1$, $12_2$, $12_3$, $12_i$ has an individual cell voltage $U_1$, $U_2$, $U_3$, $U_i$ (symbolized in the image by arrows). The cell voltages $U_1$, $U_2$, $U_3$, $U_i$ add up to the output voltage $U_{HV}$ of the HV energy store 12. Each of the cells $12_1$, $12_2$, $12_3$, $12_i$ is assigned a bi-directional DC/DC converter $17_1$, $17_2$, $17_3$, $17_i$ with galvanic isolation 18 (the dashed line 18 symbolizes the galvanic isolation; the double arrows represent the bi-directionality). The inputs of each of the bi-directional DC/DC converters $17_1$, $17_2$, $17_3$, $17_i$ are electrically conductively connected to the poles of the cell $12_1$, $12_2$, $12_3$, $12_i$ assigned thereto. The outputs of the bi-directional DC/DC converters $17_1$, $17_2$, $17_3$, $17_i$ are connected to the low-voltage vehicle electrical system 30 and to the poles of a low-voltage energy store 31 which is connected thereto and has an output voltage $U_{LV}$.

In order to charge the HV energy store 12, a low-voltage charger (not shown) is connected to the low-voltage vehicle electrical system 30 when the vehicle is at a standstill. For example, for this purpose, a low-voltage charger (e.g., a 12 V charger) can simply be connected to the jump-start connection point in the vehicle. The bi-directional DC/DC converters $17_1$, $17_2$, $17_3$, $17_i$ convert the low voltage into the required cell charging voltage and charge the individual cells $12_1$, $12_2$, $12_3$, $12_i$, and thus the HV energy store 12.

During driving operation of the vehicle, many consumers, e.g., control units, connected to the low-voltage vehicle electrical system 30 are active. This results in a high energy requirement in the low-voltage vehicle electrical system 30. In order to support the low-voltage vehicle electrical system 30 and to charge the low-voltage energy store 31, electrical energy from the HV energy store 12 is fed, via the bi-directional DC/DC converter $17_1$, $17_2$, $17_3$, $17_i$ to the low-voltage vehicle electrical system 30.

In addition, the energy system 10 enables active cell balancing before or after each trip. In this case, the voltage level of all cells $12_1$, $12_2$, $12_3$, $12_i$ is balanced by transferring electrical energy from cells with a higher voltage level to cells with a lower voltage level. If, for example, the output voltage of the cell $12_1$ is higher than the average output voltage of all cells $12_1$, $12_2$, $12_3$, $12_i$, and the output voltage of the cell $12_3$ is lower than the average output voltage of all cells $12_1$, $12_2$, $12_3$, $12_i$, then electrical energy can be transferred from the cell $12_1$, via the bi-directional DC/DC converter $17_1$, the low-voltage vehicle electrical system 30, and the bi-directional DC/DC converter $17_3$, to the cell $12_3$ and said cell $12_3$ can thus be charged.

In contrast to passive cell balancing, in which the voltage level of cells with high output voltage is reduced in that electrical energy is converted into power loss and is thus no longer available for driving operation, the electrical energy contained in the HV energy store 12 is largely retained during active cell balancing and can be used for driving operation, which increases energy efficiency and increases the range of the vehicle.

German patent application no. 10 2019 125 734.4, filed Sep. 25, 2019, to which this application claims priority, is hereby incorporated herein by reference in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An energy system for an electrically-driven vehicle, comprising:
a traction circuit having at least one high-voltage energy store that includes several storage cells connected in series; and
a traction inverter that supplies at least one electric machine with alternating voltage,
wherein each of the storage cells of the at least one high-voltage energy store is assigned a bi-directional DC voltage converter with galvanic isolation,
wherein the inputs of the bi-directional DC voltage converters with galvanic isolation are connected to poles of the respective storage cells, and outputs of the bi-directional DC voltage converters with galvanic isolation are connected to a low-voltage vehicle electrical system, and
wherein the low-voltage vehicle electrical system has an interface configured for connection to a low-voltage DC charger for charging the high-voltage energy store via the bi-directional DC voltage converters.

2. The energy system according to claim 1, wherein the low-voltage vehicle electrical system comprises at least one low-voltage energy store.

3. The energy system according to claim 1, wherein the traction circuit has an interface for connecting a high-voltage DC charger.

4. The energy system according to claim 1, wherein the low-voltage vehicle electrical system is operated at a voltage of less than 60 V.

5. The energy system according to claim 4, wherein the low-voltage vehicle electrical system is operated at a voltage of 12 V.

6. The energy system according to claim 1, wherein the at least one high-voltage energy store has an output voltage in the range of 300 to 1,200 V.

7. A method for operating an energy system comprising a traction circuit having at least one high-voltage energy store that includes several storage cells connected in series and a traction inverter that supplies at least one electric machine with alternating voltage, wherein each of the storage cells of the at least one high-voltage energy store is assigned a bi-directional DC voltage converter with galvanic isolation, and wherein the inputs of the bi-directional DC voltage converters with galvanic isolation are connected to poles of the respective storage cells and outputs of the bi-directional DC voltage converters with galvanic isolation are connected to a low-voltage vehicle electrical system, the method comprising:
charging the at least one high-voltage energy store by connecting a low-voltage DC charger to the low-voltage vehicle electrical system and transferring electrical energy from the low-voltage DC charger, via the bi-directional DC voltage converters with galvanic isolation, to the storage cells of the at least one high-voltage energy store.

8. A method for operating an energy system comprising a traction circuit having at least one high-voltage energy store that includes several storage cells connected in series and a traction inverter that supplies at least one electric machine with alternating voltage, wherein each of the storage cells of the at least one high-voltage energy store is assigned a bi-directional DC voltage converter with galvanic isolation, and wherein the inputs of the bi-directional DC voltage converters with galvanic isolation are connected to poles of the respective storage cells and outputs of the bi-directional DC voltage converters with galvanic isolation are connected to a low-voltage vehicle electrical system, the method comprising:
charging the at least one high-voltage energy store by connecting a low-voltage DC charger to the low-voltage vehicle electrical system and transferring electrical energy from the low-voltage DC charger via the bi-directional DC voltage converters with galvanic isolation, to the storage cells of the at least one high-voltage energy store; and
supplying the low-voltage vehicle electrical system by transferring electrical energy from the at least one high-voltage energy store, via the bi-directional DC voltage converters with galvanic isolation, to the low-voltage vehicle electrical system.

9. The method of claim 8, further comprising charging a low voltage energy store by transferring electrical energy from the at least one high-voltage energy store, via the bi-directional DC voltage converters with galvanic isolation, to the low-voltage vehicle electrical system.

10. A method for operating an energy system comprising a traction circuit having at least one high-voltage energy store that includes several storage cells connected in series and a traction inverter that supplies at least one electric machine with alternating voltage, wherein each of the storage cells of the at least one high-voltage energy store is assigned a bi-directional DC voltage converter with galvanic isolation, and wherein the inputs of the bi-directional DC voltage converters with galvanic isolation are connected to poles of the respective storage cells and outputs of the bi-directional DC voltage converters with galvanic isolation are connected to a low-voltage vehicle electrical system, the method comprising:

charging the at least one high-voltage energy store by connecting a low-voltage DC charger to the low-voltage vehicle electrical system and transferring electrical energy from the low-voltage DC charger, via the bi-directional DC voltage converters with galvanic isolation, to the storage cells of the at least one high-voltage energy store; and balancing load between the storage cells of the at least one high-voltage energy store, wherein electrical energy from at least one storage cell whose output voltage is higher than an average output voltage of all storage cells is transferred, via the bi-directional DC voltage converters with galvanic isolation and the low-voltage vehicle electrical system, to at least one storage cell whose output voltage is lower than the average output voltage of all storage cells.

\* \* \* \* \*